United States Patent
Lawniczak et al.

(10) Patent No.: US 11,628,925 B2
(45) Date of Patent: Apr. 18, 2023

(54) FORCE APPLICATION DEVICE FOR CONTROL STICK IN A POWER FAILURE SITUATION

(71) Applicant: SAFRAN ELECTRONICS & DEFENSE, Paris (FR)

(72) Inventors: Remi-Louis Lawniczak, Moissy-Cramayel (FR); Pascal Coppée, Moissy-Cramayel (FR); Yannick Attrazic, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/771,188

(22) PCT Filed: Oct. 23, 2020

(86) PCT No.: PCT/FR2020/051919
§ 371 (c)(1),
(2) Date: Apr. 22, 2022

(87) PCT Pub. No.: WO2021/079075
PCT Pub. Date: Apr. 29, 2021

(65) Prior Publication Data
US 2022/0348310 A1   Nov. 3, 2022

(30) Foreign Application Priority Data

Oct. 23, 2019 (FR) ...................................... 1911882

(51) Int. Cl.
*B64C 13/04* (2006.01)
*B64C 13/50* (2006.01)
(Continued)

(52) U.S. Cl.
CPC ........ *B64C 13/0421* (2018.01); *B64C 13/345* (2018.01); *B64C 13/507* (2018.01);
(Continued)

(58) Field of Classification Search
CPC . B64C 13/0421; B64C 13/507; B64C 13/345; G05G 5/03; G05G 9/047; G05G 2009/04766
See application file for complete search history.

(56) References Cited

U.S. PATENT DOCUMENTS 4,106,728 A * 8/1978 Griffith ................. B64C 13/341
                                                  244/221
5,721,566 A * 2/1998 Rosenberg .............. A63F 13/57
                                                  345/161
(Continued)

FOREIGN PATENT DOCUMENTS

EP    2 081 822 A2    7/2009
FR    3 056 315 A1    3/2018
(Continued)

OTHER PUBLICATIONS

French Search Report dated Jun. 17, 2020 in Application No. FR 1911882.
(Continued)

*Primary Examiner* — Rodney A Bonnette
(74) *Attorney, Agent, or Firm* — Birch, Stewart, Kolasch & Birch, LLP

(57) ABSTRACT

The present invention relates to a force application device for a control stick of an aircraft comprising a shaft and a control lever configured to rotate the shaft about a first axis, the device comprising: a magnetic brake comprising a braking part configured to be connected to the shaft, and a volume containing a rheological fluid in contact with the braking part, of variable shear resistance as a function of a magnetic field applied to the rheological fluid, a force feedback motor configured to exert a resistive force opposing the rotation of the shaft about the first axis, a motor power source, a movable magnetic element biased towards a position close to the magnetic brake, and distancing means configured to maintain the movable magnetic element in a position away from the magnetic brake, when such distancing means are powered by the power source.

17 Claims, 6 Drawing Sheets

(51) Int. Cl.
*B64C 13/28* (2006.01)
*G05G 5/03* (2008.04)
*G05G 9/047* (2006.01)

(52) U.S. Cl.
CPC ............... *G05G 5/03* (2013.01); *G05G 9/047* (2013.01); *G05G 2009/04766* (2013.01)

(56) References Cited

U.S. PATENT DOCUMENTS

| | | |
|---|---|---|
| 2011/0045932 A1* | 2/2011 | Fauteux ................ B25J 9/102 |
| | | 475/221 |
| 2016/0221672 A1 | 8/2016 | Latham et al. |
| 2018/0197385 A1 | 7/2018 | Jayaraman et al. |
| 2019/0210854 A1* | 7/2019 | Eck ..................... B66F 17/006 |
| 2019/0286237 A1* | 9/2019 | Eck ..................... G06F 3/0338 |
| 2022/0057826 A1* | 2/2022 | Lawniczak ............. G05G 5/03 |
| 2022/0063794 A1* | 3/2022 | Le Roux ............ B64C 13/0421 |
| 2022/0073187 A1* | 3/2022 | Werquin ................ B64C 27/56 |
| 2022/0097826 A1* | 3/2022 | Le Roux ............ B64C 13/0421 |

FOREIGN PATENT DOCUMENTS

| | | |
|---|---|---|
| WO | WO 2008/061111 A2 | 5/2008 |
| WO | WO 2008/061111 A3 | 5/2008 |

OTHER PUBLICATIONS

International Search Report dated Feb. 5, 2021 in Application No. PCT/FR2020/051919.

* cited by examiner

[Fig. 1]
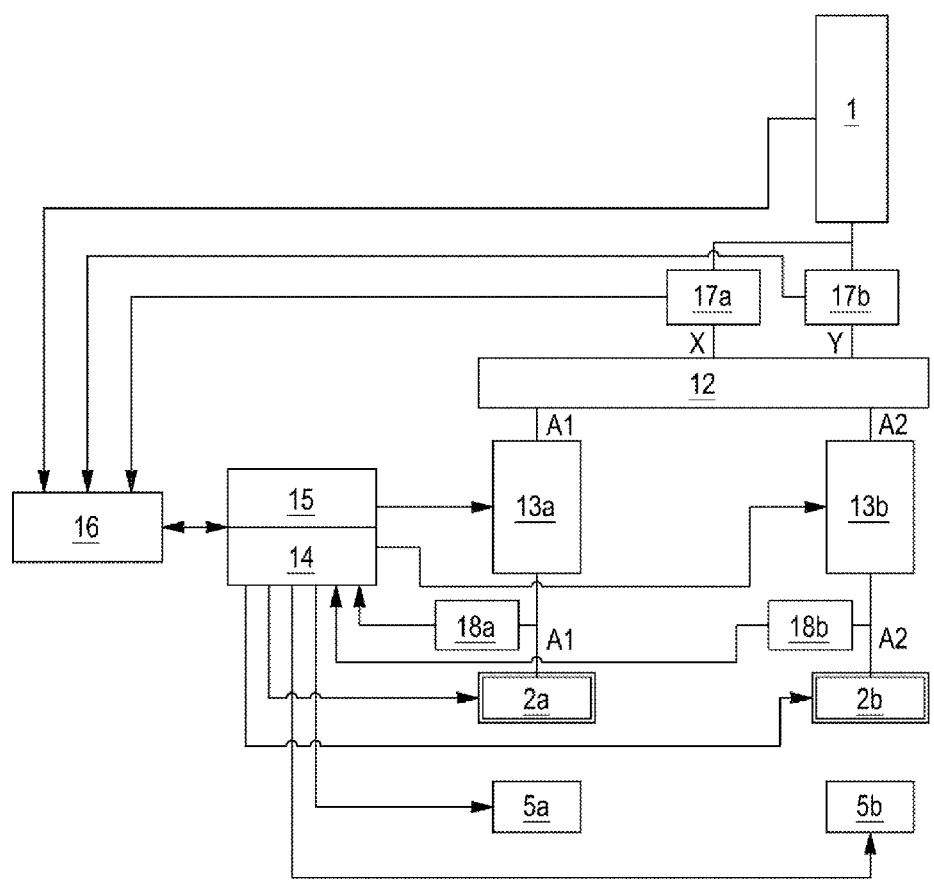

[Fig. 2]
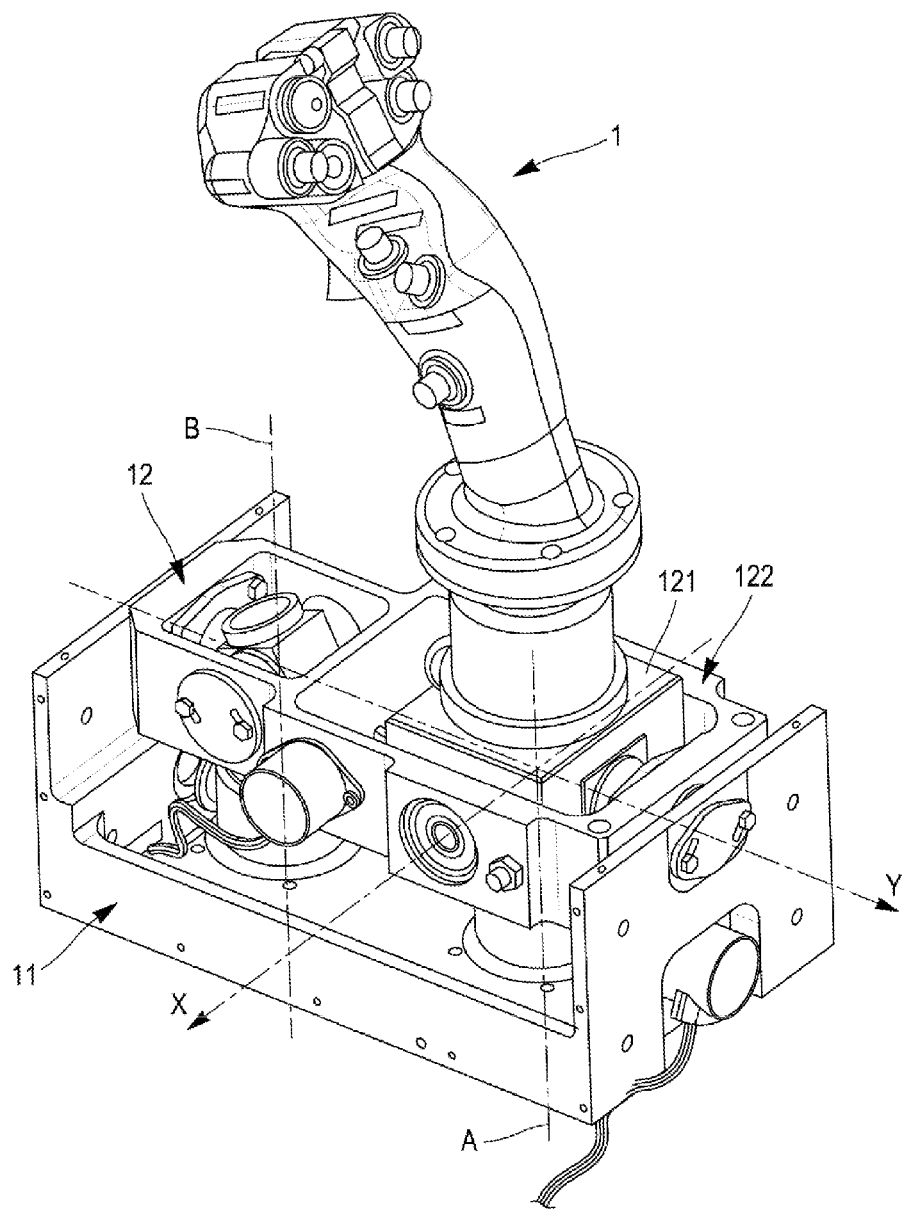

[Fig. 3]
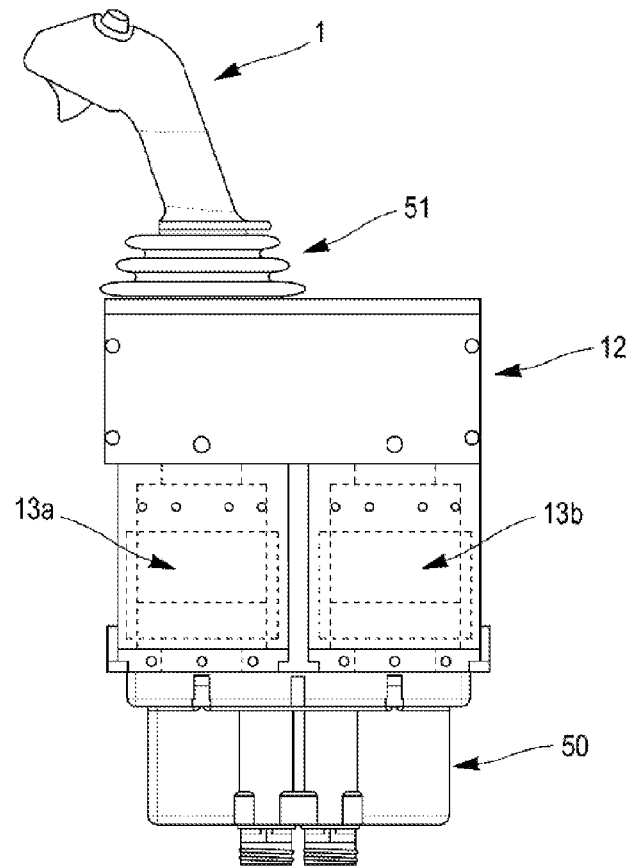

[Fig. 4]
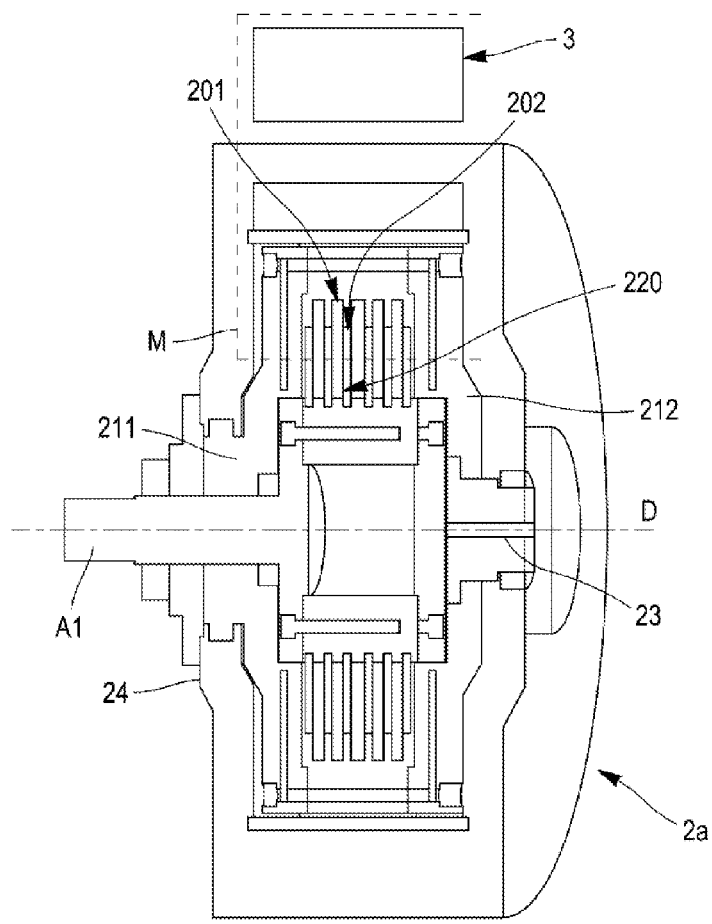

[Fig. 5a]
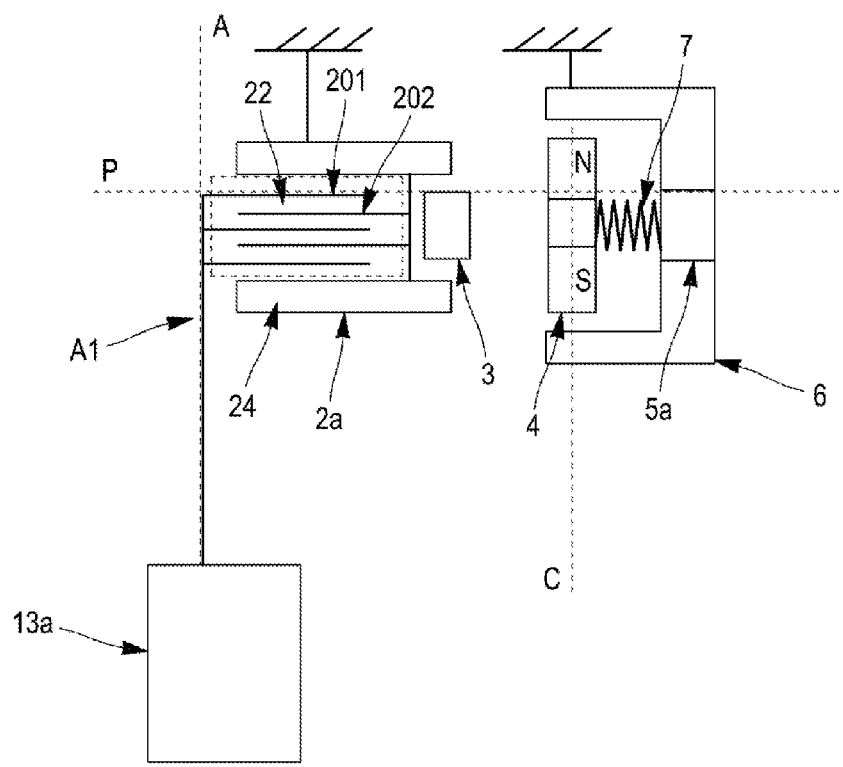

[Fig. 5b]
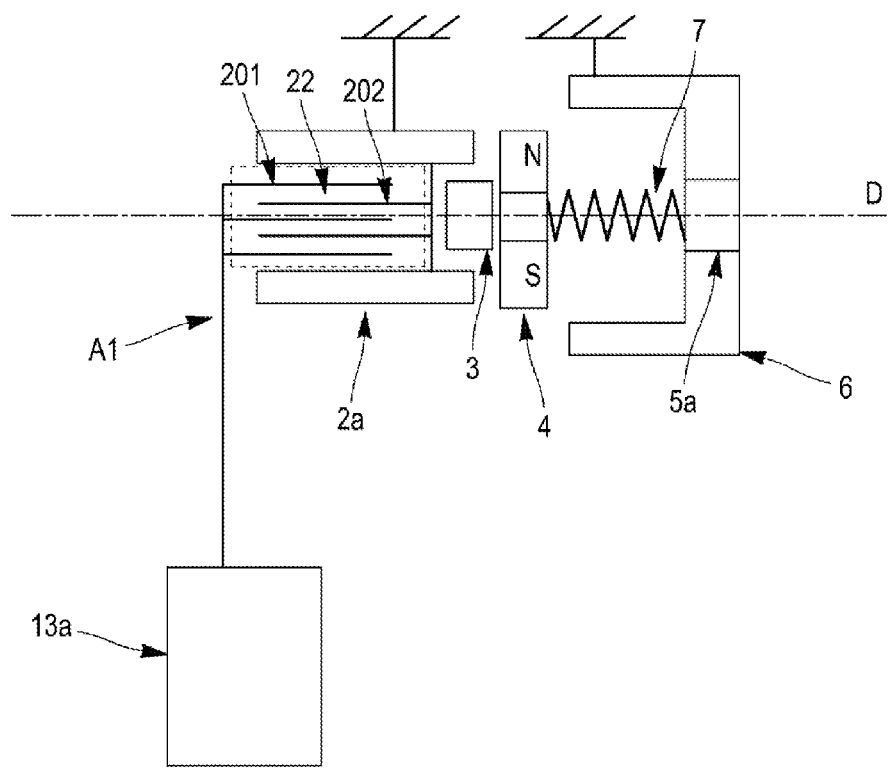

FORCE APPLICATION DEVICE FOR CONTROL STICK IN A POWER FAILURE SITUATION

FIELD OF THE INVENTION

The present invention relates to control devices used by the pilot in an aircraft cockpit. It relates in particular to an active control stick comprising integral force feedback to assist the pilot.

PRIOR ART

A control device in an aircraft cockpit usually comprises a control stick with in particular a control lever mounted in rotation along a so-called roll axis and a so-called pitch axis, these two axes being orthogonal to one another. The control sticks most often encountered are of the "broom handle" type.

The control device transmits displacement commands to the control members of the aircraft, the displacement commands being determined as a function of the position of the lever along these two axes.

On the most recent models of control sticks, the control surface commands are electronic (also called "fly-by-wire" commands) and the control device integrated into the cockpit can be of the "side stick" type. The position of the lever along the two axes of roll and pitch is measured by sensors and translated into displacement commands. The lever is not directly connected mechanically to the movable parts of the aircraft. The pilot therefore does not feel a direct mechanical feedback.

However, it is desirable for flight safety that the pilot perceive a feedback force at the lever. This feedback force must be variable as a function of the condition of the aircraft. The signaling systems of the cockpit may not be sufficient to cause a sufficiently rapid response by the pilot facing unpredictable events during the flight.

Control sensation is therefore much better if the control side stick integrates active force feedback, also called "haptic feedback."

For this reason, it has been proposed to equip the side stick with passive mechanical systems for force feedback, such as spring systems, or active electromechanical systems.

Document FR 3 011 815 describes a force feedback device with an electric motor. In this document, the aircraft flight control device includes a control lever mounted on a plate and connected to a roll axis motor and a pitch axis motor via transmission shafts. The two motors, called force feedback motors, are controlled via a force law. During the operation of the side stick, these motors generate a resistive force opposing the force exerted on the lever (force feedback). An apparatus of this type has proven effective for restoring the control sensation and increasing flight safety.

However, in the event of an electrical or mechanical failure of one of the force feedback motors, or in case of a partial or total breakdown of the processing chain of the control signals of these motors, or even in the event of electrical power failure, the force feedback can be eliminated.

The pilot no longer feels haptic feedback on the lever, or even an anchoring point of the lever. However, in the field of aeronautics, the requirements as regards operating safety of the control devices are critical. It is therefore not acceptable that the pilot abruptly passes into a control mode without force feedback, and without an anchoring point, in the event of failure of a motor or of its processing chain.

To provide "mechanical backup" and prevent free control of the lever in the event where, for example, one or more force motors broke down, it has been proposed to add mechanical systems for locking the lever to the side stick.

However, these systems are generally complex, costly and unreliable. They also generate considerable bulk.

It has moreover been proposed to add brakes in the side stick to provide the mechanical backup. For example, certain side sticks of the prior art integrate two magneto-rheological brakes which can be electronically activated. When they are activated, the two brakes exert a resistive force countering the displacement of the lever along the roll and pitch axes.

A major disadvantage of these side sticks of the prior art is the necessity of additional electrical power dedicated to the brakes, different from that of the force feedback motors, for example a battery and a backup wind turbine (also called RAT for "ram-air turbine"). Indeed, when the usual power source of the force feedback motors is faulty, it is necessary that the brakes be powered correctly. An additional power supply of this type increases the complexity of the control system.

In addition, these systems do not allow providing mechanical backup in the case of a breakdown affecting the activation processing chain of the brakes. For example, in the event of general power unavailability, the magneto-rheological brakes do not operate.

GENERAL DESCRIPTION OF THE INVENTION

With regard to the foregoing, there exists a need for an aircraft control stick integrated a mechanical backup path able to prevent the rotation of the lever from being free, and therefore preventing the pilot from losing all force feedback in the event of general power unavailability at the control stick.

It is desired to enlarge the breakdown cases for which the control stick integrates a backup path, in particular to cover cases of general electrical unavailability, and increase flight safety.

What is sought is a control stick with a smaller mass, bulk and electrical power consumption relative to existing control sticks integrating a mechanical backup path.

Preferably, the control stick sought is bereft of additional power supply dedicated to the mechanical backup path.

There exists an additional need for a control stick in which the elements providing the mechanical backup of the force feedback motors have increased reliability and a satisfactory lifetime.

To respond to these needs, a first object of the invention is a force application device for a control stick of an aircraft, the control stick comprising a shaft and a control lever configured to drive the shaft in rotation around a first axis, the device comprising:

a magnetic brake including:
a braking part configured to be connected to the shaft, and
a volume containing a rheological fluid in contact with the braking part, resistance to shear of the rheological fluid being variable as a function of a magnetic field applied to the rheological fluid, a force feedback motor configured to exert a resistive force opposing the rotation of the shaft around the first axis, a power source for the force feedback motor, the device also comprising:

a movable magnetic element having a position close to the magnetic brake and a position distant from the magnetic brake, the movable magnetic element emitting a magnetic field in the volume in the close position, the movable magnetic element being biased toward the close position, separating means configured to retain the movable magnetic element in the distant position when the separating means are supplied with electrical power by the power source and configured not to retain the movable magnetic element in the distant position when the separating means are not powered.

The magnetic brake of the force application device of the invention is able to exert a resistive force on the shaft, in the event of failure of the force feedback motor, for example a roll motor or a pitch motor.

The separating means—comprising for example a solenoid—of the movable magnetic element share the same power source with the force feedback motor. Thus, in the event of electrical failure or power failure affecting the force feedback motor, the separating means are also affected by this failure and no longer bias the magnetic element toward the position distant from the brake.

Moreover, the movable magnetic element being biased toward the position close to the brake, this element—which is for example a permanent magnet—approaches the brake and magnetizes a magnetizable element integrated into the brake. This magnetizable element is here a volume containing a rheological fluid.

The brake then accomplishes its function of mechanical backup and prevents the free rotation of the control lever of the aircraft.

One advantage of this force application device is that in the event of electrical failure of the force feedback motor, the brake engages in a completely automatic and passive manner, via the displacement of the movable magnetic element. The force application device of the invention is therefore particularly advantageous for covering a power failure situation affecting the force feedback motor.

An additional advantage is the low power consumption of this force application device, in its nominal mode. A small additional electrical current is sufficient to hold the brake ready to be actuated.

It will be noted that it is not necessary to supply separate electrical power dedicated to the control of the magnetic brake. In one possible variant, the brake is not controlled electronically, and is actuated by approaching the movable magnetic element.

Another advantage of the force application device of the invention is its small mechanical complexity. The additional elements (movable magnetic element, means for separating said device from the brake) allowing the functionality of the brake in the event of power failure can be very simple and requiring little space.

According to one possible operating mode, the force application device is configured to provide complete blockage of the control lever in the event of power failure affecting the motor, the resistive force exerted on the shaft by the magnetic brake being sufficiently great to block the shaft in rotation.

The force application device of the invention can also have, optionally and without limitation, the following features, taken alone or in any one of the technically possible combinations:

the device also comprises return means configured to exert a return force on the movable magnetic element tending to displace the magnetic element in the close position, the return force being less than a separating force exerted on the movable magnetic element by the separating means when the separating means are powered.

The separating means comprise a solenoid, the solenoid being preferably place opposite to the magnetic brake relative to the movable magnetic element.

the separating means comprise a magnetic circuit defining a cavity, the circuit being arranged so that the cavity receives the movable magnetic element in the distant position.

the rheological fluid comprises a magneto-rheological fluid or a magnetic powder.

the control stick comprises a frame, and the magnetic brake comprises a fixed part mounted on the frame, the fixed part delimiting, with the braking part, the volume containing the rheological fluid.

the movable magnetic element comprises a permanent magnet.

the braking part comprises a brake disk extending in an extension plane, the permanent magnet extending along an axis perpendicular to the extension plane.

the movable magnetic element is able to produce an induction magnetic field in the volume greater than a threshold comprised between 0.1 Tesla and 10 Tesla.

the device also comprises an electromagnet configured to generate a variable magnetic field in the rheological fluid volume.

the device also comprises a mechanical joint integral in rotation with the lever around a second axis, and a force sensor configured to exert a torque exerted on the mechanical joint around the second axis.

the control lever also drives an additional shaft in rotation around a third axis, and the device also comprises:

an additional magnetic brake able to exert a resistive force to prevent rotation of the additional shaft around the third axis, said additional brake comprising an additional volume of rheological fluid, an additional force feedback motor configured to exert a resistive force opposing the rotation of the additional shaft around the third axis, an additional movable magnetic element having a position close to the additional brake and a position distant from the additional brake, the additional movable magnetic element emitting a magnetic field in the additional rheological fluid volume in the close position, the additional movable magnetic element being biased toward the position close to the additional brake, additional separating means configured to retain the additional movable magnetic element in the position distant from the additional brake.

According to a second object, the invention relates to an active control stick comprising a force application device as defined above, and also comprising a control lever movable in rotation around a second axis, the rotation of the shaft around the first axis being connected to the rotation of the lever around the second axis.

Optionally and without limitation, said active control stick can have the following features, taken alone or in any one of the technically possible combinations:

the stick comprises a shaft movable in rotation around a first axis and connected to the braking part of the force application device, the stick also comprises a computer configured to transmit a control signal to the force feedback motor, the resistive force exerted on the shaft by the force feedback motor during the operation of the stick being a function of a set point force value encoded in the control signal.

the power source of the force feedback motor is configured to supply power to the computer, the separating means being configured to be deactivated in the event of an electrical failure affecting the computer.

According to a third object, the invention relates to an aircraft comprising an active control stick of this type.

According to a fourth object, the invention relates to the use of a force application device as defined above within an aircraft control stick in order to prevent, during a breakdown affecting the power source of the force feedback motor, a rotation of the shaft around the first axis.

GENERAL DESCRIPTION OF THE FIGURES

Other features, aims and advantages of the invention will be revealed by the description that follows, which is purely illustrative and not limiting, and which must be read with reference to the appended figures in which:

FIG. 1 shows functionally the overall architecture of a control system comprising a control stick according to one embodiment of the invention.

FIG. 2 is a perspective view of the control lever and of the mechanical joint of the control system shown in FIG. 1.

FIG. 3 is a schematic side view of the control system of FIG. 1, this stick integrated a force application device and integrating in particular two force feedback motors.

FIG. 4 is a section view of a magnetic brake according to one example.

FIG. 5a is a schematic view of a force application device according to one embodiment, in which a movable permanent magnet of the force application device is at a position distant from the magnetic brake.

FIG. 5b is a schematic view of the same force application device, in which the movable permanent magnet of said device is at a position close to the magnetic brake.

DETAILED DESCRIPTION OF ONE EMBODIMENT

Hereafter, examples relating to an aircraft control stick movable in rotation around a roll axis X and around a pitch axis Y will be described. The force application device of the invention can be used, however, with the same advantages, in association with a control stick movable around one or more displacement axes different from a roll or pitch axis of rotation.

What is meant hereafter by the "damping law" of the magnetic brake is the relation between the angular position of the lever around an axis of rotation and the resistive force produced countering a displacement in rotation around said axis, for example by a force feedback motor. What is meant in addition by the "force law" is the relation between the position of the lever and the total force rendered by the lever, which can be resistive or driving (this total force taking into account the action of one or more force feedback motors and possibly the action of brakes).

In all the figures and in the description hereafter, similar elements carry identical alphanumerical references.
General Architecture of the Control Stick Shown in FIG. 1 is a functional architecture of the control system of an aircraft, the aircraft being controlled in particular along a roll axis and along a pitch axis. The control system shown comprises in particular a control side stick; the side stick is typically located in the cockpit of the aircraft.

In this figure, the non-arrowed lines between two functional units correspond to mechanical connections. The arrowed connections are electrical and/or electronic connections by which data and electrical power can be transmitted.

The system comprises a control lever 1. The lever is mounted in rotation around a roll axis X and a pitch axis Y of the lever, the two axes being orthogonal. The pilot acts on the angular position of the lever around the roll axis and the pitch axis to control the movable parts of the aircraft.

Preferably, the control lever 1 is mounted on the mechanical joint 12, for example on a plate of the mechanical joint. The mechanical joint can be mounted on a casing integral with the floor of the aircraft. Elements of the mechanical joint 12 are integral with the lever 1 in rotation around the roll axis X and elements of the mechanical joint 12 are integral with the lever 1 in rotation around the pitch axis Y. One example of a mechanical joint 12 will be described hereafter.

The control system also comprises a computer 15 and a flight control unit 16, or FCS for "Flight Control System."

Electronic signals of the position of the lever acquired by an angular position sensor 18a associated with the roll axis X and an angular position sensor 18b of the lever associated with the pitch axis Y are communicated to the control unit 16. Optionally, the sensors 18a and 18b also communicate information about the speed of rotation of the lever 1 around the roll and pitch axes. The position/speed information of the lever is translated by the control unit 16 into control signals for the movable parts of the aircraft.

In conformity with the invention, the control stick of FIG. 1 also comprises a force application device. Here, the force application device is able to exert a resistive force opposing the rotation of the lever around the roll axis and around the pitch axis. One function of the force application device is to provide the force feedback or "haptic feedback" on the stick, in response to the manipulation of the lever 1 by the pilot.

The force application device comprises a force feedback motor 13a associated with a shaft A1 with axis A. The shaft A1 is a drive shaft of the force feedback motor 13a. The shaft A1 is mechanically linked to the rotation movements of the lever 1 around the roll axis X, here via the mechanical joint 12. When the lever 1 pivots around the roll axis X, the shaft A1 is driven in rotation around its axis A.

Likewise, the force application device comprises here a force feedback motor 13b associated with a drive shaft A2 with axis B. The shaft A2 is connected with the pitch axis Y of the lever. The force feedback motors 13a and 13b are electric motors.

As an alternative, the force feedback motor 13a could be arranged to act directly on the roll axis X via its drive shaft. Likewise, the force feedback motor 3b could be arranged to act directly on the pitch axis Y.

Optionally and advantageously, the force feedback motors 13a and 13b are direct drive motors. The motors act directly on the mechanical joint without speed reduction or deflection.

Moreover, the force feedback motors are preferably torque motors, capable of transmitting a high rotary torque on the shafts even in the event of rotor blockage. For example, motors with a low rotation speed and with a high rotary torque are used.

Preferably, the rotary torque exerted by the force feedback motors is controlled as a function of rotation speed information of the lever, or the position of the lever.

The computer 15 provides the control of the restrictive force supplied by the force feedback motors 13a and 13b countering the rotation movements of the lever 1 respectively around the roll axis X and the pitch axis Y. The computer 15 generates and transmits to the motors a control signal encoding a force set point, for example a set point of the resistive torque produced by the motors.

The computer 15 comprises an electronic interface for receiving signals including position/speed information about the lever and transmitting this information to the control unit 16. The force set point is determined as a function of position/speed information of the lever and/or as a function of other data. The force set point is for example calculated according to a predetermined force law recorded in a memory of the control unit. The determination of the force set point is accomplished by the control unit 16 and/or by the computer 15.

The force application device comprises a first magnetic brake 2a acting on the shaft A1 and a second magnetic brake 2b acting on the shaft A2. The magnetic brake 2a and the magnetic brake 2b are able to exert a resistive force opposing the rotation of the lever, respectively around the roll axis and around the pitch axis, when said brakes are activated. In the present example, the magnetic brakes 2a and 2b admit directly as input shafts the shafts A1 and A2 associated with the force feedback motors 13a and 13b. The magnetic brakes are thus directly engaged on the drive shafts of the force feedback motors.

Each magnetic brake comprises a magnetizable element able to be magnetized when a magnetic field is applied to it. As will be seen hereafter, the magnetostatic interactions between the magnetizable element and, for example, a permanent magnet are such as to brake or block the relative rotation of the input shaft and the output shaft of the magnetic brake.

In the exemplary embodiment described hereafter, the magnetizable element is a rheological fluid. The rheological fluid is a fluid, the shear resistance of which is variable as a function of the magnetic field which is applied to it. The rheological fluid will, hereafter be a magneto-rheological fluid in which the particles in suspension are aligned with the field lines of the applied magnetic field. As an alternative, the rheological fluid can be a magnetic powder. Still alternatively, it is possible to use a disk of ferromagnetic material, able to reversibly acquire magnetization in response to an applied magnetic field.

Also shown in FIG. 1 is a power source 14 supplying electrical power to the force feedback motor 13a. Here, the power source 14 also supplies electrical power to the force feedback motor 13b.

In the event of malfunction affecting the power source 14 (for example in the event of a localized electrical failure in this power source or even a general electrical failure), the force feedback motor 13a is not able to exert the desired resistive force on the control lever 1 to oppose the pivoting of the latter around the roll axis X. The haptic feedback felt by the pilot is therefore affected.

As will be seen hereafter, the magnetic brake 2a is configured to exert a resistive force on the roll axis X in the event of a breakdown affecting the power source 14, via the deactivation of the separating means 5a. The separating means act on the position of a movable magnetic element. The later element activates the magnetic brake 2a when said device and said brake are sufficiently close. The magnetic brake 2a forms an emergency mechanical path for the force feedback motor 13a.

The separating means 5a are supplied with power by the power source 14 and therefore undergo a malfunction affecting the power source 14.

Likewise, the magnetic brake 2b forms an emergency mechanical path for the force feedback motor 13b, via the deactivation of the separating means 5b which are supplied with electrical power by the power source 14.

As an alternative, a first power source could power the force feedback motor 13a and the separating means 5a, and a second power source could power the force feedback motor 13b and the separating means 5b.

A great advantage of this construction is that the magnetic brakes are triggered automatically, passively, in the event of a breakdown affecting the power source 14. Thus, during a breakdown which affects the electrical power supply of the force feedback motors, the mechanical backup of the motors is provided without any human intervention and without the necessity of configuring a specific control of the magnetic brakes.

It is not necessary to provide for additional "emergency" electrical power units to activate the magnetic brakes. In fact, the magnetic brakes are actuated by the lack of power at the power source 14.

Advantageously, the power source 14, to which are connected the force feedback motors 13a and 13b, also accomplishes the electrical power supply of the computer 15. For example, the force feedback motors 13a and 13b are directly powered by the computer 15 itself.

In this case, an interruption or a failure of the electrical power supply of the computer 15 impact the electrical power supply of the force feedback motors on the one hand, and electrical power supply of the separating means on the other hand. Thus, the magnetic brakes 2a and 2b intervene as mechanical backups not only in the case of a loss of power supply to the motors, but also in the event of loss of power supply to the computer. There too, the actuation of the magnetic brakes in the event of failure of the computer is passive and requires neither human intervention nor a specific control member.

Optionally, the control system also comprises force sensors 17a and 17b measuring respectively the force exerted by the pilot on the lever 1 on the axis X and on the axis Y. This can involve any known type of force sensor, for example capacitive, piezoelectric or resistive sensors.

Sensors of this type are useful in particular if the control system comprises a force-based control mode. In a mode of this type, the lever 1 is immobilized in rotation around the roll axis X and the pitch axis Y. The control unit 16 then calculates the signals for controlling the movable parts of the aircraft as a function of the forces applied to the lever 1 by the pilot.

In an alternative architecture, the force feedback motors 13a and 13b could be omitted from the force application device. The magnetic brakes 2a and 2b can then be associated with electromagnets emitting a variable magnetic field, to exert a predetermined resistive force as a function of the position and/or the speed of the lever 1. The resistive force depends on a magnetic field emitted by the electromagnets, this field being determined, for example, by the control unit 16 according to a damping law.

FIG. 2 shows the upper portion of a control stick of an exemplary embodiment conforming to the architecture of FIG. 1, in a perspective view in which the inner parts of a mechanical joint are visible.

The lever 1 is arranged on a mechanical joint 12 attached to a casing 11 integral with a frame of the aircraft. The mechanical joint 12 is movable in rotation relative to the casing around the axes X and Y. The force feedback motors 13a and 13b (not visible in FIG. 2) are offset here from the lever. For their part, the magnetic brakes 2a and 2b are also offset from the lever.

The lever 1 is free at one end, so as to be able to be manipulated by the pilot of the aircraft. The lever 1 is attached to a first plate 121 of the mechanical joint 12 at the other end. The first plate 121 is movable in rotation around the axis X and around the axis Y and is connected to a second plate 122 of the mechanical joint 12. The axis X is connected to the first plate 121 so that pivoting of the first plate around the axis Y pivots the axis X around the axis Y.

The mechanical joint 12 is connected to the shafts A1 and A2 serving as drive shafts to the force feedback motors 13*a* and 13*b* respectively (not illustrated). The shaft A1 extends along the axis A and the shaft A2 extends along the axis B. In the present example, two transmissions, each comprising a universal joint, translate a rotation movement of the lever 1 around the axis X, respectively along the axis Y, into a rotation movement of the shaft A1 around the axis A, respectively of the shaft A2 around the axis B.

The force feedback motors 13*a* and 13*b* are engaged directly on the mechanical joint 12 via their respective drive shafts. The force feedback motors transmit to the lever, via the mechanical joint, a resistive or driving force in response to the pivoting movements of the lever 1 by the pilot, according to a predetermined force law or damping law.

For a detailed example of the structure of the mechanical joint 12 and of the mechanical connection between this joint and the force feedback motors, FIG. 1 of document FR 3 011 815 and the related description can be referred to.

FIG. 3 illustrates the control stick of FIG. 2 viewed from the side.

In FIG. 3, the control lever 1 is located in a neutral position or "neutral point." In this position the lever, the control commands act neither in roll nor in pitch on the control surfaces of the aircraft. The lever 1 is mounted on the cabin of the cockpit on a base having a bellows 51.

Shown in FIG. 3 in dotted lines is the position of the force feedback motors 13*a* and 13*b*. The two force feedback motors 13*a* and 13*b* have identical dimensions in this example.

The base of the control lever 1 includes a housing 50 attached with respect to the frame of the aircraft. The elements implementing the emergency mechanical path of the motors, particularly the magnetic brakes, are located here below the motors inside the housing 50. The drive shafts A1 and A2 continue inside the housing 50.

In this example, the magnetic brakes are therefore located opposite to the mechanical joint relative to the force feedback motors.

Magnetic Brake

FIG. 4 shows a magnetic brake 2*a* according to one example. The magnetic brake 2*a* is illustrated with a section view passing through the axis A of the shaft A1. The shaft A1 serves as an input shaft for the magnetic brake 2*a*.

The brake comprises an enclosure 24 with a generally cylindrical shape. The enclosure 24 is centered on the axis A. The brake also comprises an output shaft 23. Preferably, the output shaft is coaxial with the input shaft.

Here the shaft A1 is driven by the force feedback motor 13*a* and the output shaft 23 is connected to the frame of the control stick. The shaft A1 is therefore movable in rotation around the axis A with respect to the output shaft 23.

The brake comprises a plurality of brake disks. The brake disks are comprised between a first sealed wall 211 and a second sealed wall 212 of the enclosure 24. The brake disks comprise a first series of disks integral in rotation with the shaft A1 and a second series of disks integral in rotation with the output shaft 23. The brake disks are bored at their center and centered on the axis A.

Along the axis A, the disks of the first series of disks alternate with the disks of the second series of disks.

Shown in particular in FIG. 4 is a first disk 201 integral with the shaft A1 and a second disk 202 integral with the output shaft 23 (therefore fixed here with respect to the frame). The first disk 201 faces the second disk 202.

Between the lateral faces of the first disk 201 and the second disk 202, a sealed volume 220 is provided suitable for receiving the magneto-rheological fluid 22. The sealed volume 220 is delimited by the first disk 201 and the second disk 202.

During the operation of the control stick, the magneto-rheological fluid 22 is in the liquid state. The sealing of the sealed volume is preferably provided by gaskets at the spacers between the disks. The magneto-rheological fluid can be admitted inside the sealed volume by means of filling channels, not shown.

In the same manner, other sealed volumes are provided between the lateral faces of other brake disks. The magneto-rheological fluid 22 is contained in said sealed volumes.

When the shaft A1 pivots around the axis A, the disks integral with the shaft A1 of the first series of disks pivot relative to the disks integral with the output shaft 23 of the second series of disks, shearing the magneto-rheological fluid contained in the sealed volumes.

Under the influence of an applied magnetic field, the magneto-rheological fluid is magnetized. Inside the magneto-rheological fluid, particles in suspension in a carrier fluid (typically metallic particles) align in the form of chains of particles parallel to the lines of the applied magnetic field. The resistance of the magneto-rheological fluid to shear is increased under the influence of the applied magnetic field.

The magneto-rheological fluid 22 thus tends to prevent the rotation of the first disk 201 relative to the second disk 202. The brake in the activated state therefore opposes the rotation of the shaft A1 relative to the frame of the aircraft.

The resistive force exerted by the magnetized magneto-rheological fluid is much greater than the resistive torque exerted by the unmagnetized magneto-rheological fluid.

In the example of FIG. 4, the magnetic brake 2*a* is also associated with an electromagnet 3 configured to exert a variable magnetic field in the sealed volumes of magneto-rheological fluid, so as to vary the resistance to shear of the magneto-rheological fluid. The electromagnet 3 is for example arranged on one side of the magnetic brake 2*a*, near the sealed volumes containing the magneto-rheological fluid. The electromagnet 3 is typically used to simulate a damping law, during the normal operation of the stick.

Shown in dotted lines is a field line M generated with an electrical current circulates in the terminals of the electromagnet 3.

As an alternative, the electromagnet 3 can be omitted and the resistance to shear of the magneto-rheological fluid can then be solely modulated as a function of the position of the movable permanent magnet 4, which will be described hereafter.

One advantage of the example of a magnetic brake illustrated in FIG. 4 is its small bulk. The magnetic brake 2*a* couples and decouples on command the rotation movements of the shaft A1 and of the output shaft 23 around their respective axes, by means of a small number of mechanical components. This magnetic brake also has good performance in transmitting the resistive torque.

Preferably, the force application device has no mechanical transmission members, for example deflecting elements or elements performing a speed reduction, between the magnetic brake 2*a* and the shaft A1 of the force feedback motor 13a. In particular, the force application device is preferably bereft of deflectors between the magnetic brake and the force feedback motor.

Advantages of this construction are reduced bulk of the magnetic brake, good transmission of the resistive torque to the lever and good general ergonomics of the side stick integrating this device, due to the absence of parasite torque variations.

An additional advantage is the absence of additional parts generating friction between the magnetic brake and the motor shaft. The lifetime of the magnetic brake is improved and the presence of the force application device has little impact on the angular travel range of the lever.

As an alternative, deflectors or parts performing a reduction in the speed of rotation can be provided, between the input shaft(s) of a magnetic brake or the two brakes and the drive shaft(s) of the force feedback motor(s).

Movable Magnetic Device and Movement Means of the Movable Magnetic Element

FIG. 5a illustrates schematically the elements of a force application device conforming to the architecture of FIG. 1. This figure illustrates a condition of the device during the normal operation of the control stick. Shown is the magnetic brake 2a providing the mechanical backup of the force feedback motor 13a (not illustrated in the figure), as well as the separating means of the magnetic brake 2a.

For greater conciseness, only the magnetic brake 2a and the actuating means associated with it will be described hereafter. It will be understood that in the case where the force application device includes another brake, such as the magnetic brake 2b, the latter is preferably associated with similar means of actuation.

The means of actuation of the brake comprise here an electromagnet 3, a movable permanent magnet 4, means 5a for separating the movable permanent magnet relative to the magnetic brake, a magnetic circuit 6 and means for returning the magnet.

The movable permanent magnet 4 is, in the present example, a rectilinear magnetized clip comprising a North pole labeled N in the figure, and a South pole labeled S. The rectilinear clip extends longitudinally along an axis C.

Preferably, the axis C is perpendicular with respect to the extension planes of the brake disks of the magnetic brake 2a. One of these planes bears the reference P in FIG. 5a. Thus, the magnetic field produced by the movable permanent magnet 4 at the brake disks is substantially directed orthogonally to the surfaces of said disks in the zone containing the magneto-rheological fluid.

The movable permanent magnet 4 constitutes a movable magnetic element. Other movable devices able to emit a magnetic field can be used as a complement or in place of the movable permanent magnet 4.

Depending on the distance between the movable permanent magnet 4 and the magneto-rheological fluid contained in the magnetic brake 2a, the magnetic field applied in the volumes occupied by the magneto-rheological fluid is more or less intense. The resistive force exerted by said brake on the shaft A1 is therefore more or less high depending on said distance.

The movable permanent magnet 4 is associated with return means comprised in the force application device, which tend to move the magnet closer to the magnetic brake 2a. Here the return means consist of a spring 7.

A first end of the spring 7 is connected to the movable permanent magnet 4, typically at a point located in the middle of the movable permanent magnet 4 if the latter is a magnetized clip. A second end of the spring 7 is connected to the part integral with the frame of the aircraft.

In the position illustrated in FIG. 5a, the spring 7 works in expansion and exerts a return force which tends to press the magnet toward the magnetic brake 2a.

In an alternative embodiment, it is possible to use a second permanent magnet to bias the movable permanent magnet 4 in a position close to the brake. Any means able to bias the movable permanent magnet 4 toward the close position, not requiring electrical power supply to exert this bias on the permanent magnet, can be used in combination with or in place of the return means.

In addition, the movable permanent magnet 4 is associated with separating means comprised in the force application device, which tend to separate the magnet from the magnetic brake 2a.

The separating means retain the movable magnetic element (the magnet here) in the position distant from the magnetic brake 2a when the separating means are supplied with electrical power, as illustrated in FIG. 5a.

The magnet being in the position distant from the magnetic brake 2a, the magnetic field applied in the volumes occupied by the magneto-rheological fluid of the magnetic brake 2a is insufficient to magnetize said magneto-rheological fluid.

The separating means consist here of the solenoid 5a. The magnetic polarity of the solenoid is selected so that, when an electrical current circulates in the terminals of the solenoid, the latter exerts a magnetostatic force on the movable permanent magnet 4 which tends to contain it in the zone where the solenoid 5a creates a magnetic field, i.e. so as to exert a return force from the movable permanent magnet 4 toward the solenoid 5a.

When the solenoid has an electrical current running through it, it counters the return means, here countering the spring. The induction of the magnetic field generated by the solenoid increases with the intensity of the electrical current that passes through it.

The solenoid is dimensioned so that the magnetostatic force which it exerts on the movable permanent magnet 4 in the direction of elongation of the spring is greater than the return force exerted by the spring.

The solenoid 5a is powered by the same power source as the force feedback motor 13a, i.e. the power source 14 (not illustrated in FIG. 5a).

By way of an example, an electrical connection connects the solenoid 5a and the force feedback motor 13a, and the solenoid is powered via this electrical connection.

Preferably, the solenoid is placed opposite to the magnetic brake 2a relative to the movable magnetic element, i.e. relative the movable permanent magnet 4 here.

Advantageously, the solenoid 5a is associated with a magnetic circuit 6.

The magnetic circuit 6 is integral with the frame of the aircraft. When the movable permanent magnet 4 is located in proximity to the magnetic circuit 6, the magnetic circuit 6 channels the magnetic field produced by the movable permanent magnet 4.

In the present example, the magnetic circuit 6 has a U shape and comprises a rectilinear central body at which the solenoid 5a is positioned, as well as two lateral branches. The magnetic circuit 6 thus extends on either side of the solenoid 5a. The two lateral branches extend from the central body toward the brake.

The distance between the two lateral branches of the magnetic circuit 6 is greater than the length of the movable permanent magnet 4 along the axis C. the two lateral branches thus define a cavity in which the movable permanent magnet 4 is received when the magnet is in the position distant from the magnetic brake 2a.

When the magnetic field of the magnet is channeled by the magnetic circuit 6, the movable permanent magnet 4 emits a negligible magnetic field in the volumes occupied by the magneto-rheological fluid in the magnetic brake 2a.

Thus, the magnetic circuit 6 ensures that, when the movable permanent magnet 4 is in a position distant from the magnetic brake 2a such as the position illustrated in FIG. 5a, the movable permanent magnet 4 does not participate in magnetizing the magneto-rheological fluid.

As an alternative, the force application device can be bereft of a magnetic circuit. The range of displacement of the movable permanent magnet 4 must then be sufficiently great that the magnet can reach, under the influence of the separating means, a sufficiently distant position from the magnetic brake 2a that the magnetic field exerted on the magneto-rheological fluid is negligible.

The electromagnet 3 is optional and allows simulating a damping law on the lever by means of the magnetic brake 2a during the normal operation of the control stick. The electromagnet 3 is positioned in proximity to the brake disks contained in the magnetic brake 2a. The electromagnet 3 emits a variable magnetic field as a function of the electrical current applied to its terminals.

Preferably, the electromagnet 3 is attached to the casing of the aircraft. The electromagnet 3 is also integral with the frame of the aircraft.

If the magnetic brake 2a is used only as a magnetic "backup" of the force feedback motor 13a, the electromagnet 3 is not necessary.

FIG. 5b illustrates schematically the magnetic brake 2a and the actuating means, in a position distinct from that illustrated in FIG. 5a.

In FIG. 5b, the magnetic brake 2a is actuated. The actuated position of the brake corresponds to an electrical failure affecting the force feedback motor 13a (not illustrated in the figure).

In the state shown in FIG. 5b, the power source 14 is dysfunctional. The fore feedback motor 13a and the separating means 5a (the solenoid here) are therefore in a power failure situation.

The solenoid is inactivated and therefore does not exert magnetostatic force on the movable permanent magnet 4. The permanent magnet 4 is not biased by the solenoid in a direction of separation relative to the magnetic brake 2a.

Under the loading of the return means, here the spring 7 which works in expansion, the movable permanent magnet 4 reaches, in equilibrium, a position close to the magnetic brake 2a.

The movable permanent magnet 4 is therefore not held distant from the brake when the separating means, here the solenoid, are not powered.

In the position close to the magnetic brake 2a, the movable permanent magnet 4 generates a magnetic field passing through the magneto-rheological fluid. This field freezes said fluid and accomplishes the blocking of the disks. Preferably, the magnet is able to produce, in the volumes occupied by the magneto-rheological fluid, an induction magnetic field greater than a predetermined threshold comprised between 0.1 Tesla and 10 Tesla. The predetermined threshold corresponds to the field necessary for magnetizing the magneto-rheological fluid and coupling the input shaft and the output shaft of the magnetic brake 2a.

Due to the interruption or the failure of electrical power supply to the solenoid, the magnetic brake 2a is passively triggered. A resistive force, opposite to the rotation of the lever 1 around the roll axis X, is exerted on the shaft A1.

Example of Operation of the Force Application Device

Described here is an operation of the control stick integrating the force application device conforming to FIGS. 5a and 5b, following a breakdown event affecting a power source of the roll force feedback motor 13a. The magnetic brake 2a is then the mechanical backup of the force feedback motor 13a to prevent a rotation of the lever of the control stick around the roll axis X.

It will be understood that if the force application device comprises an associated pitch force feedback motor 13b and brake, the operation of the force application device is similar for the mechanical backup of the pitch motor.

Just prior to the occurrence of the breakdown, the device is in the state shown in FIG. 5a.

During the electrical failure affecting the power source 14, here during a generalized unavailability of electrical power, the separating means 5a are affected to the same degree as the force feedback motor 13a. As an alternative, the breakdown event can be a failure in the processing or the communication of control signals including the force set point for the motor. The separating means 5a do not then exert a sufficient separating force on the permanent magnet 4 to hold it in position distant from the brake. The separating means 5 are for example cut off.

The spring 7, for its part, is not affected by the electrical failure. The return force exerted in the direction D (visible in FIG. 5b) on the permanent magnet 4 is therefore maintained. The result is a displacement of the magnet toward the brake.

The displacement range of the magnet is dimensioned so that the magnet reaches a position where it exerts a high magnetic field on the magneto-rheological fluid of the magnetic brake 2a.

In particular, in the case where the force application device includes a magnetic circuit 6, the permanent magnet 4 is moved out of the magnetic circuit during the interruption of electrical power supply of the separating means 5a.

Under the influence of this magnetic field, the magneto-rheological fluid inside the magnetic brake 2a has its resistance to shear increased. The brake is activated.

The brake is dimensioned so that following its activation, the lever is blocked in pivoting around the roll axis, under the influence of the resistance to shear of the magneto-rheological fluid. Preferably, the force application device has another brake for also blocking the lever around the pitch axis.

Optionally, once blocked, the control stick passes into a force-based control mode.

In the force-based control mode, the roll force sensor 17a and the pitch force sensor 17b take over from the position and/or speed sensors 18a and 18b on the roll and pitch axes of the lever, for controlling the movable parts of the aircraft. The lever remains blocked for the duration of the force-based control mode.

The force-based control mode can then be deactivated when the electrical failure affecting the power source of the force feedback motor is resolved.

The magnetic brake thus forms a mechanical backup, preventing the control stick from switching into a mode where the pilot can freely pivot the lever. The magnetic brake is able to block the kinematic chain of the lever.

As an alternative, it is possible to integrate the magnetic brake into the force law exerted on the lever in the event of normal operation of the control stick. The magnetic brake is then not activated only in the event of electrical power interruption of the separating means of the permanent magnet. The brake participates in the force feedback, as a complement to the electric force feedback motors.

The operation of the force application device described above is advantageous because the actuation of the magnetic brake(s) in the event of electrical failure is passive. No human intervention, or any specific control member which would have to have its own separate electrical power available, is necessary.

The invention claimed is:

1. A force application device for a control stick of an aircraft, the control stick comprising a shaft and a control lever configured to drive the shaft in rotation around a first axis, the force application device comprising:
   a magnetic brake including:
      a braking part configured to be connected to the shaft,
      a volume containing a rheological fluid in contact with the braking part, resistance to shear of the rheological fluid being variable as a function of a magnetic field applied to the rheological fluid,
   a force feedback motor configured to exert a resistive force opposing the rotation of the shaft around the first axis,
   a power source of the force feedback motor,
   a movable magnetic element having a position close to the magnetic brake and a position distant from the magnetic brake, the movable magnetic element emitting a magnetic field in the volume in the close position, the movable magnetic element being biased toward the close position, and
   separating means configured to retain the movable magnetic element in the distant position when the separating means are supplied with electrical power by the power source, and configured not to retain the movable magnetic element in the distant position when the separating means are not powered.

2. The force application device according to claim 1, also comprising return means configured to exert a return force on the movable magnetic element tending to displace the movable magnetic element in the close position, the return force being less than a separating force exerted on the movable magnetic element by the separating means a when the separating means are powered.

3. The force application device according to claim 2, wherein the separating means comprise a magnetic circuit defining a cavity, the circuit being arranged so that the cavity receives the movable magnetic element in the distant position.

4. The force application device according to claim 1, wherein the separating means comprise a solenoid.

5. The force application device according to claim 4, wherein the solenoid is placed opposite to the magnetic brake relative to the movable magnetic element.

6. The force application device according to claim 1, wherein the rheological fluid comprises a magneto-rheological fluid or a magnetic powder.

7. The force application device according to claim 1, wherein the control stick comprises a frame, and wherein the magnetic brake comprises a fixed part mounted on the frame, the fixed part delimiting, with the braking part, the volume.

8. The force application device according to claim 1, wherein the movable magnetic element comprises a permanent magnet.

9. The force application device according to claim 8, wherein the braking part comprises a brake disk extending in an extension plane, the permanent magnet extending along an axis perpendicular to the extension plane.

10. The force application device according to claim 1, wherein the movable magnetic element is able to produce an induction magnetic field in the volume greater than a threshold comprised between 0.1 Tesla and 10 Tesla.

11. The force application device according to claim 1, also comprising an electromagnet configured to generate a variable magnetic field in the volume.

12. The force application device according to claim 1, also comprising a mechanical joint integral in rotation with the lever around a second axis, and comprising a force sensor configured to exert a force exerted on the mechanical joint around the second axis.

13. The force application device according to claim 1, wherein the control lever also drives an additional shaft in rotation around a third axis, the force application device also comprising:
   an additional magnetic brake able to exert a resistive force to prevent a rotation of the additional shaft around the third axis, said additional brake comprising an additional volume of rheological fluid,
   an additional force feedback motor configured to exert a resistive force opposing the rotation of the additional shaft around the third axis,
   an additional movable magnetic element having a position close to the additional brake and a position distant from the additional brake, the additional movable magnetic element emitting a magnetic field in the additional rheological fluid volume in the close position, the additional movable magnetic element being biased toward the position close to the additional brake,
   additional separating means configured to retain the additional movable magnetic element in the position distant from the additional brake.

14. An active aircraft control stick comprising:
   a force application device according to claim 1,
   a shaft movable in rotation around a first axis and connected to the braking part of the force application device,
   a control lever movable in rotation around a second axis, the rotation of the shaft around the first axis being connected to the rotation of the control lever around the second axis.

15. The stick according to claim 14, also comprising a computer configured to transmit a control signal to the force feedback motor, the resistive force exerted on the shaft by the force feedback motor during the operation of the stick being a function of a set point force value encoded in the control signal.

16. The stick according to claim 15, wherein the power source of the force feedback motor is configured to supply power to the computer, and wherein the separating means are configured to be deactivated in the event of an electrical failure affecting the computer.

17. Use of a force application device according to claim 1 to prevent, during an electrical failure affecting the power source of the force feedback motor, a rotation of the shaft around the first axis.

* * * * *